United States Patent
Park et al.

(10) Patent No.: US 7,715,474 B2
(45) Date of Patent: May 11, 2010

(54) DECISION FEEDBACK EQUALIZER (DFE) ARCHITECTURE

(75) Inventors: Matthew J. Park, Cambridge, MA (US); John F. Bulzacchelli, Yonkers, NY (US)

(73) Assignee: International Business Machines Corporation, Armonk, NY (US)

( * ) Notice: Subject to any disclaimer, the term of this patent is extended or adjusted under 35 U.S.C. 154(b) by 718 days.

(21) Appl. No.: 11/672,270

(22) Filed: Feb. 7, 2007

(65) Prior Publication Data

US 2008/0187036 A1   Aug. 7, 2008

(51) Int. Cl.
*H03H 7/30* (2006.01)
(52) U.S. Cl. ..................................... 375/233
(58) Field of Classification Search ............... 375/229, 375/230, 232, 233
See application file for complete search history.

(56) References Cited

U.S. PATENT DOCUMENTS

| | | | |
|---|---|---|---|
| 7,000,175 B2* | 2/2006 | Azadet et al. | 714/794 |
| 7,230,985 B2* | 6/2007 | Park et al. | 375/233 |
| 7,499,489 B1* | 3/2009 | Ellersick et al. | 375/229 |
| 2006/0158225 A1 | 7/2006 | Stojanovic et al. | |
| 2006/0188043 A1 | 8/2006 | Zerbe et al. | |
| 2006/0227912 A1 | 10/2006 | Leibowitz et al. | |
| 2009/0010320 A1* | 1/2009 | Hollis | 375/232 |

OTHER PUBLICATIONS

T. Beukema et al., A 6.4-Gb/s CMOS SerDes Core with Feed-Forward and Decision-Feedback Equalization, IEEE J. Solid-State Circuits, vol. 40, pp. 2633-2645, Dec. 2005.
S. Kasturia and J. H. Winters, Techniques for High-Speed Implementation of Nonlinear Cancellation, IEEE J. Sel. Areas Commun., vol. 9, pp. 711-717, Jun. 1991.
V. Balan et al., A 4.8-6.4-Gb/s Serial Link for Backplane Applications Using Decision Feedback Equalization, IEEE J. Solid-State Circuits, vol. 40, pp. 1957-1967, Sep. 2005.
R. Payne et al, A 6.25-Gb/s Binary Transceiver in 0.13 m CMOS for Serial Data Transmission Across High Loss Legacy Backplane Channels, IEEE J. Solid-State Circuits, vol. 40, pp. 2646-2657, Dec. 2005.

(Continued)

*Primary Examiner*—David B Lugo
(74) *Attorney, Agent, or Firm*—Tutunjian & Bitetto, P.C.; Anne V. Dougherty, Esq.

(57) ABSTRACT

A decision feedback equalizer (DFE) and method includes summer circuits to add a dynamic feedback signal representing an h2 tap to a received input and to speculate on an h1 tap. Data slicers receive and sample the outputs of the summer circuits using a clock signal to produce even data bits and odd data bits. First and second multiplexers receive the even data bits and the odd data bits. A first output latch is configured to receive an output of the first multiplexer to provide a select signal for the second multiplexer and to drive the dynamic feedback signal to an even half summer circuit of the summer circuits. A second output latch is configured to receive an output of the second multiplexer to provide a select signal for the first multiplexer and to drive the dynamic feedback signal to an odd half summer circuit of the summer circuits.

20 Claims, 7 Drawing Sheets

OTHER PUBLICATIONS

Jin Liu et al.; Equalization in High-Speed Communication Systems; IEEE Circuits and Systems Magazine; Second Quarter 2004; pp. 4-17.

Balan et al.; A 4.8-6.4 Gbps Serial Link for Back-plane Applications using Decision Feedback Equalization: IEEE; 2004; pp. 31-34.

Leibowitz et al.; A 7.5Gb/s 10-Tap DFE Receiver with First Tap Partial Response, Spectrally Gated Adaptation, and 2nd-Order Data-Filtered CDR; IEEE International Solid-State Circuits Conference; 2007; pp. 228, 229 and 599.

* cited by examiner

_US 7,715,474 B2_

DECISION FEEDBACK EQUALIZER (DFE) ARCHITECTURE

GOVERNMENT RIGHTS

This invention was made with Government support under Contract No.: H98230-04-C-0920 awarded by the National Security Agency. The Government has certain rights in this invention.

BACKGROUND

1. Technical Field

The present invention relates generally to equalization techniques for high-speed data communications and more specifically to practical implementations of decision feedback equalizer circuits.

2. Description of the Related Art

As the processing power of digital computing engines grows with improvements in technology, and increasingly interconnected networks are developed to harness this power, higher bandwidth data transmission is needed in systems such as servers and data communication routers. Increasing data line rates above a few gigabits per second becomes challenging, however, due to limited channel bandwidth. The bandwidth of an electrical channel (e.g., transmission line) may be reduced by several physical effects, including skin effect, dielectric loss, and reflections due to impedance discontinuities. In the time domain, limited channel bandwidth leads to broadening of the transmitted pulses over more than one unit interval (UI), and the received signal suffers from intersymbol interference (ISI).

At the data rates being demanded, signal integrity may be significantly degraded even over short distances of interconnect (such as several inches of trace on a circuit board). An effective method of compensating for the signal distortions due to limited channel bandwidth is to add equalization functions to the input/output (I/O) circuitry. The use of a nonlinear equalizer known as a decision-feedback equalizer (DFE) in the receiver is particularly well-suited to equalizing a high-loss channel. Unlike linear equalizers, the DFE is able to flatten the channel response (and reduce signal distortion) without amplifying noise or crosstalk, which is a critical advantage when channel losses exceed 20-30 dB.

In a DFE, the previously decided bits are fed back with weighted tap coefficients and added to the received input signal. If the magnitudes and polarities of the tap weights are properly adjusted to match the channel characteristics, the ISI from the previous bits in the data stream will be cancelled, and the bits can be detected by a data slicer with a low bit error rate (BER). The adjustment of the tap weights can be performed either manually or automatically by an appropriate adaptive algorithm.

A major challenge in the design of a DFE operating at multi-gigabits per second is ensuring that the feedback signals have settled accurately at the slicer input before the next data decision is made. If a full-rate DFE architecture is used, the feedback loop delay (including the decision-making time of the slicer and the analog settling time of the DFE summing amplifiers) needs to be less than one UI. Simply switching to a half-rate architecture such as the one described in R. Payne et al., "_A 6.25-Gb/s Binary Transceiver in 0.13-μm CMOS for Serial Data Transmission Across High Loss Legacy Backplane Channels_", IEEE J. Solid-State Circuits, Vol. 40, pp. 2646-2657, December 2005, does not ease this requirement, as there is still only one UI available to establish the feedback from the previously detected bit, weighted by a first tap coefficient (denoted as h1).

The timing requirements on the first DFE feedback tap can be eased by adopting a technique known as speculation or loop unrolling. (See e.g., S. Kasturia and J. H. Winters, _Techniques for High-Speed Implementation of Nonlinear Cancellation_, IEEE J. Sel. Areas Commun., Vol. 9, pp. 711-717, June 1991). In this approach, both +h1 and −h1 are added to the input signal with two parallel summing amplifiers. Since (for binary data transmission) the previous bit can only have one of two different values, one of these DC offsets added to the input signal represents the correct compensation of the ISI due to the previous bit. The outputs of the two summing amplifiers are then converted by two parallel slicers into two data decisions. Once the previous bit is known, the data decision corresponding to correct polarity of h1 compensation is selected with a 2:1 multiplexer (MUX). Since the h1 compensation is implemented as multiple DC offsets instead of a dynamically changing feedback signal, analog settling time requirements for the first DFE feedback tap are eliminated.

In principle, additional DFE feedback taps (such as the second one denoted as h2, the third one denoted as h3, etc.) may also be implemented by speculation, but the number of parallel data decisions that need to be made grows exponentially with the number of taps.

In practice, a more hardware-efficient design of a high-speed DFE can be obtained by adopting a hybrid speculative/dynamic feedback architecture, in which the first tap is implemented by speculation, and the rest of the taps are implemented as dynamically changing feedback signals. With half-rate clocking (or lower rate clocking such as quarter-rate), the critical timing requirement in this hybrid architecture is the loop delay for the h2 feedback tap (including time for analog settling). Since the h2 feedback tap compensates for ISI due to the bit which arrived two UI earlier, ideally there should be 2 UI of time available for accurately establishing the h2 feedback signal at the slicer inputs. This 2 UI loop delay will be referred to here as the "fundamental timing limit" of the hybrid speculative/dynamic feedback DFE.

Unfortunately, this fundamental timing limit cannot be fully achieved in prior art implementations of the hybrid speculative/dynamic feedback DFE. In order not to disturb the h2 dynamic feedback signal prematurely, these implementations deliberately delay the selection between the speculative data decisions until some time after the slicers have sampled the equalized data signals. This delay of the select signal (usually accomplished with a clocked latch) creates a second critical timing path for the DFE. With typical propagation delays, this second critical timing path prevents the DFE from achieving its fundamental timing limit. To allow a DFE to operate at higher frequency and achieve its fundamental timing limit, it is desirable to have an architecture which eliminates this second critical timing path while still preventing disturbance of the h2 feedback signal at the time of data decision by the slicers.

SUMMARY

A decision feedback equalizer (DFE) includes summer circuits configured to add a dynamic feedback signal representing an h2 tap to a received input and to speculate on an h1 tap. Data slicers are configured to receive outputs of the summer circuits and sample the outputs of the summer circuits in accordance with a clock signal such that first data slicers produce even data bits and second data slicers produce odd data bits. First and second multiplexers are configured to receive as input, respectively, the even data bits and the odd data bits. A first output latch is configured to receive an output of the first multiplexer wherein a first latch output is employed to provide a select signal for the second multiplexer and to drive the dynamic feedback signal to an even half summer circuit of the summer circuits. A second output latch is configured to receive an output of the second multiplexer wherein a second latch output is employed to provide a select signal for the first multiplexer and to drive the dynamic feedback signal to an odd half summer circuit of the summer circuits.

Another decision feedback equalizer (DFE) includes first stage summers configured to add a dynamic feedback signal representing an h2 tap to a received input and second stage summers configured to speculate on an h1 tap where both +h1 and −h1 are separately added to an output of the first stage summers. Data slicers are configured to receive outputs of the second stage summers and sample the outputs of the second stage summers in accordance with a clock signal such that first data slicers produce even data bits and second data slicers produce odd data bits. A first multiplexer is configured to receive as input the even data bits, and a second multiplexer is configured to receive as input the odd data bits. A first output latch is configured to receive an output of the first multiplexer wherein a first latch output is employed to provide a select signal for the second multiplexer and to drive the dynamic feedback signal to an even half summer circuit of the first stage summers, and a second output latch is configured to receive an output of the second multiplexer wherein a second latch output is employed to provide a select signal for the first multiplexer and to drive the dynamic feedback signal to an odd half summer circuit of the first stage summers such that the first and second output latches provide protection against disturbances for the dynamic feedback signal without introducing another critical path delay.

In other embodiments, the data slicers each include a pair of master-slave latches. The pair of master-slave latches may operate such that when a master of each pair employs a clock signal, a corresponding one of the first output latch and the second output latch employs a clock signal complement, and when the master of each pair employs the clock signal complement, a corresponding one of the first output latch and the second output latch employs the clock signal.

The data slicers may each include a master latch and a corresponding one of the first output latch and the second output latch acts as a slave latch. In one embodiment, when the master latch employs a clock signal, the corresponding slave latch employs a clock signal complement, and when the master latch employs the clock signal complement, the corresponding slave latch employs the clock signal. The DFE may include a multi-level DFE, where the multi-level includes greater than two levels, e.g., the DFE may operate with 4 level pulse amplitude modulation signaling. The DFE preferably achieves a fundamental timing limit of a half-rate DFE architecture with one tap of speculation.

A method for decision feedback equalizing includes speculating on an h1 tap using summer circuits configured to add a dynamic feedback signal representing an h2 tap to a received input, sampling outputs of the summer circuits in accordance with a clock signal such that first data slicers produce even data bits and second data slicers produce odd data bits, multiplexing the even data bits and the odd data bits using first and second multiplexers, respectively, and latching outputs of the first and second multiplexers such that a first latch output corresponding to the first multiplexer is employed to provide a select signal for the second multiplexer and to drive the dynamic feedback signal to an even half summer circuit of the summer circuits, and a second latch output corresponding to the second multiplexer is employed to provide a select signal for the first multiplexer and to drive the dynamic feedback signal to an odd half summer circuit of the summer circuits.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
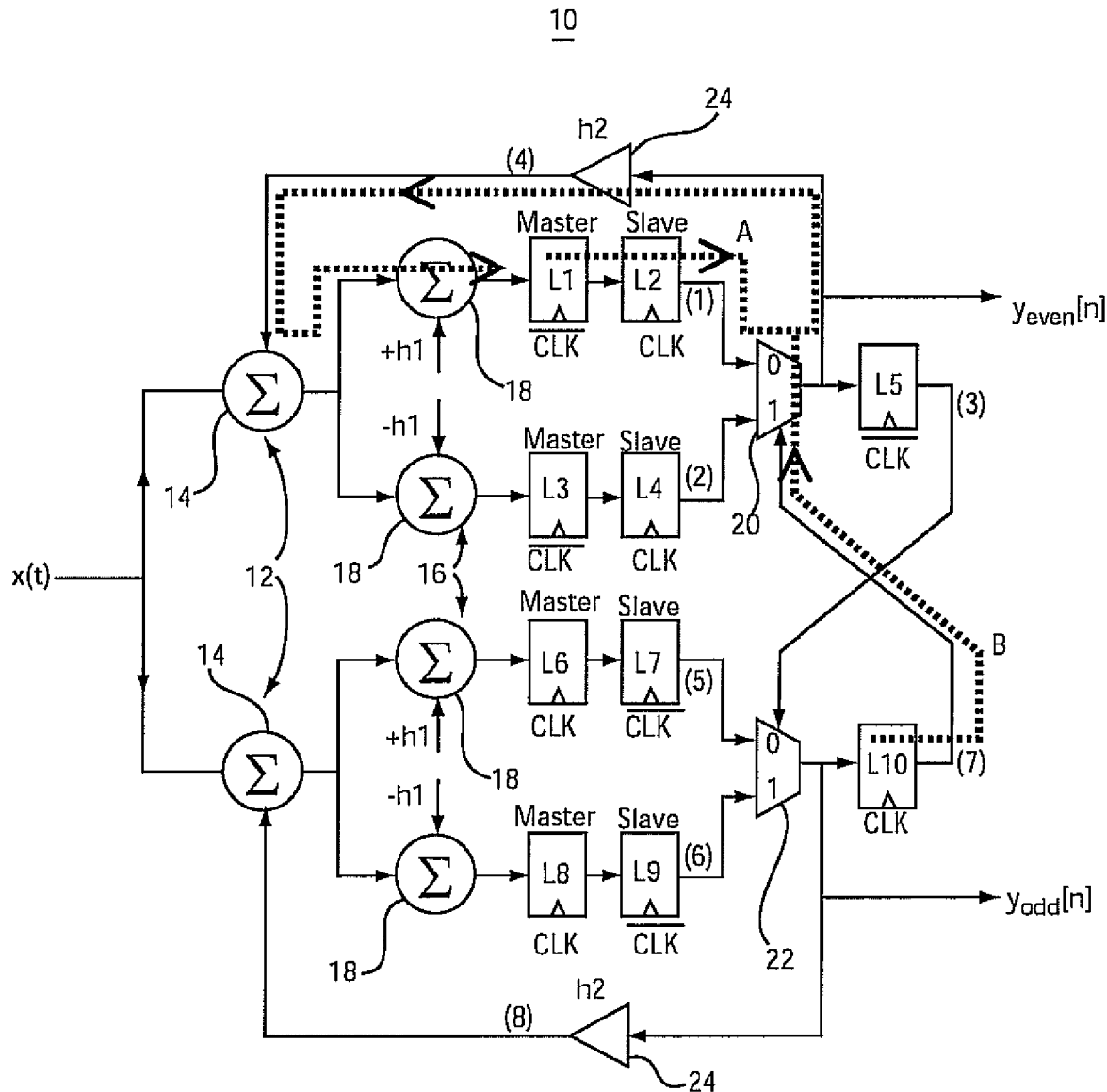
FIG. 1 is a schematic diagram showing a prior art half-rate decision feedback equalizer (DFE) architecture.

Embodiments described herein provide a hybrid speculative/dynamic feedback half-rate decision feedback equalizer (DFE) for equalizing high-speed serial links wherein the maximum operating frequency is set only by the fundamental timing limit. For example, with a DFE having a speculative first tap, an h2 feedback loop delay is preferably less than 2 UI. The DFE architecture in accordance with the present embodiments does not need delaying of the signal (previous bit) which selects between the speculative data decisions, so the timing of the select signal path is not critical to the maximum operating frequency. To prevent early arrival of this select signal from disturbing the h2 dynamic feedback signal before the slicers have sampled their inputs, a latch is placed between a 2:1 MUX used for speculation and the h2 feedback circuitry. When the slicers make their bit decisions, this latch is transparent and only adds a small propagation delay to the h2 feedback signal. One UI later, this latch is switched to an opaque (latched) state so that the h2 feedback signal is protected from changes in the 2:1 MUX output caused by early switching of the select signal.

Embodiments of the present invention can take the form of an entirely hardware embodiment, an entirely software embodiment or an embodiment including both hardware and software elements. In a preferred embodiment, the present invention is implemented in hardware, for example, on a printed wiring board, integrated circuit or any other circuit implementation. However, the present embodiments may be utilized and/or modeled in software, which may include but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Embodiments in accordance with the present principles may be part of the design for an integrated circuit chip. The chip design may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., Graphic Data System II (GDSII)) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Referring now to the drawings in which like numerals represent the same or similar elements and initially to FIG. 1, a prior art architecture 10 of a half-rate decision feedback equalizer (DFE) as described in T. Beukema et al., "A 6.4-Gb/s CMOS SerDes Core with Feed-Forward and Decision-Feedback Equalization", IEEE J. Solid-State Circuits, Vol. 40, pp. 2633-2645, December 2005, incorporated herein by reference, is depicted. A first stage 12 of analog summers 14 is used to add a dynamic feedback signal representing an h2 DFE tap to the received input x(t). An h1 DFE tap is implemented by speculation, so both +h1 and −h1 are added to the input in a second stage 16 of analog summers 18. A full design described in Beukema et al. also includes three more dynamic taps (h3, h4, and h5), but those taps are not shown in FIG. 1 because they are not relevant to the critical timing paths being addressed here. Data slicers are realized as master-slave flip-flops (L1-L2, L3-L4, L6-L7, and L8-L9). CLK is a half-rate clock signal, so the upper two master-slave flip-flops (L1-L2 and L3-L4) sample the equalized data on the rising edge of CLK (producing the even data bits), and the lower two master-slave flip-flops (L6-L7 and L8-L9) sample the equalized data on the falling edge of CLK (producing the odd data bits).

2:1 multiplexers (MUX) 20 and 22 at the master-slave flip-flop outputs (L2, L4, L7, L9) select the data decision which corresponds to correct polarity of h1 compensation. Since a previous bit is decided by the opposite DFE half, the select signal for the MUX 20 in the even DFE half comes from the odd DFE half, and the select signal for the MUX 22 in the odd DFE half comes from the even DFE half.

A critical timing requirement in this hybrid speculative/dynamic feedback DFE architecture 10 is a loop delay for the h2 feedback tap, whose path is indicated by a dashed line labeled "A". To satisfy the fundamental timing limit defined earlier, the round-trip loop delay is to be less than 2 UI, so one can write:

$$T_{clk2q}+T_{pd}+T_{sum}+T_{setup}<2UI,$$

where $T_{clk2q}$ is the clock-to-Q delay of the master-slave flip-flops (e.g., L1 and L2), $T_{pd}$ is the total propagation delay through the 2:1 MUX (20 or 22) and h2 feedback generator circuitry 24, $T_{sum}$ is the settling time of the analog summing stages (e.g., 14 and 18), and $T_{setup}$ is the setup time of the master-slave flip-flops (e.g., L1 and L2).

Unfortunately, the fundamental timing limit set by this equation often cannot be fully achieved in this architecture due to a second critical timing path, indicated by a dashed line labeled "B". In order not to disturb the h2 dynamic feedback signal prematurely, the previous bit is delayed in a latch L10 (or latch L5 as the case may be) before it selects the 2:1 MUX 20 of the even DFE half. An example given below will illustrate the problem that occurs when this delay is eliminated. Because latch L10 is clocked with the same phase of CLK as the slaves L2 and L4, the select signal of the 2:1 MUX 20 may lag its data inputs if the clock-to-Q delay of L10 exceeds the clock-to-Q delays of the master-slave flip-flops (L1-L2 and L3-L4), in which case the output of the 2:1 MUX 20 will suffer extra delay.

Figure 2:
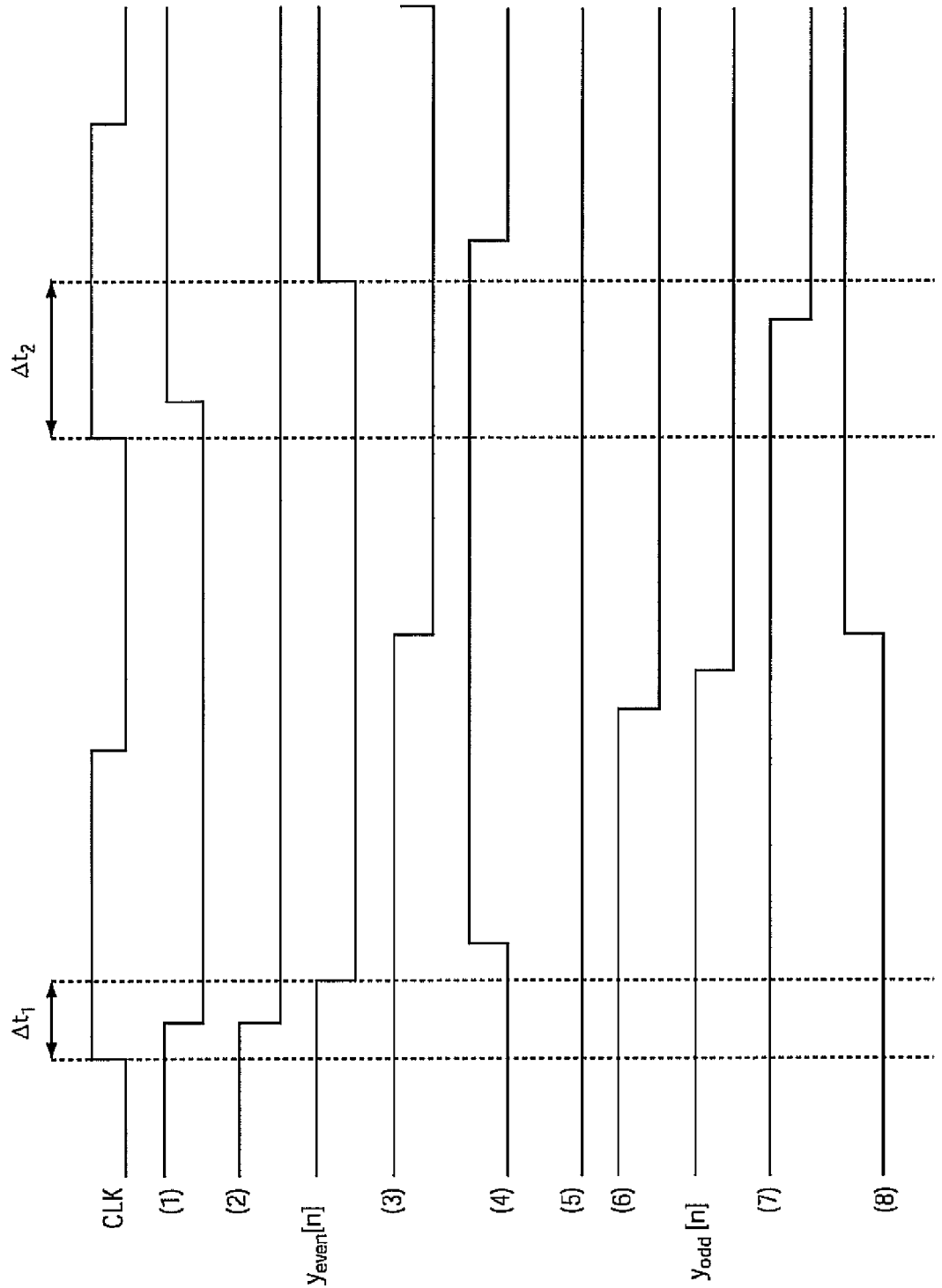
FIG. 2 is a timing diagram of the DFE architecture shown in FIG. 1.

To further illustrate this point, FIG. 2 presents a timing diagram of the DFE architecture shown in FIG. 1. Some signals of FIG. 1 are indicated as (1)-(8).

Referring to FIG. 2, the coefficient of the h2 feedback tap is assumed to be negative, so signals (4) and (8) have polarities opposite to $y_{even}[n]$ and $y_{odd}[n]$, respectively. In FIG. 2, the clock-to-Q delays of L10 (signal (7)) and L5 (signal (3)) are exaggerated to highlight the impact of the second critical timing path. At the time of the first rising edge of CLK, the output of latch L10 (signal (7)) does not switch but maintains its high value. Therefore, only the clock-to-Q delay of master-slave flip-flop L3-L4 (signal (2)) and the propagation delay of the 2:1 MUX 20 contribute to the delay ($\Delta t_1$) between the rising edge of CLK and the update in the value of $y_{even}[n]$. At the time of the second rising edge of CLK, the output of latch L10 (7) switches from high to low. Since at this time master-slave flip-flops L1-L2 and L3-L4 make different decisions (signals (1) and (2)), the 2:1 MUX 20 can only generate the correct data bit after its select signal has gone low. Due to the long clock-to-Q delay of latch L10, the delay ($\Delta t_2$) between the rising edge of CLK and the update in the value of $y_{even}[n]$ is now greater. In a real implementation, the clock-to-Q delay of latch L10 would not be so disproportionately long. However, even if the clock-to-Q delay of latch L10 matches the clock-to-Q delays of master-slave flip-flops L1-L2 and L3-L4, some penalty will usually be incurred from the second critical timing path because the delay of the 2:1 MUX 20 from select to output is typically greater than from data input to output. This penalty prevents the architecture of FIG. 1 from achieving the fundamental timing limit.

Referring again to FIG. 1, an attempt to eliminate the second critical timing path by changing the clocking of latches L5 and L10 may be considered. For example, invert the clocking of the latches L5 and L10, so latch L5 is clocked by CLK, and latch L10 is clocked by the complement of CLK. When the master-slave flip-flops (e.g., L6-L7 and L8-L9) make their decisions, the latch (e.g., L10) after the 2:1 MUX 22 is now in the transparent state, so the new data decision arrives (after a short propagation delay) at the select input of the 2:1 MUX 20 in the other DFE half. As shown in the timing diagram of FIG. 3, inverting the clocking of latches L5 and L10 eliminates the second critical timing path, but creates other issues.

Figure 3:
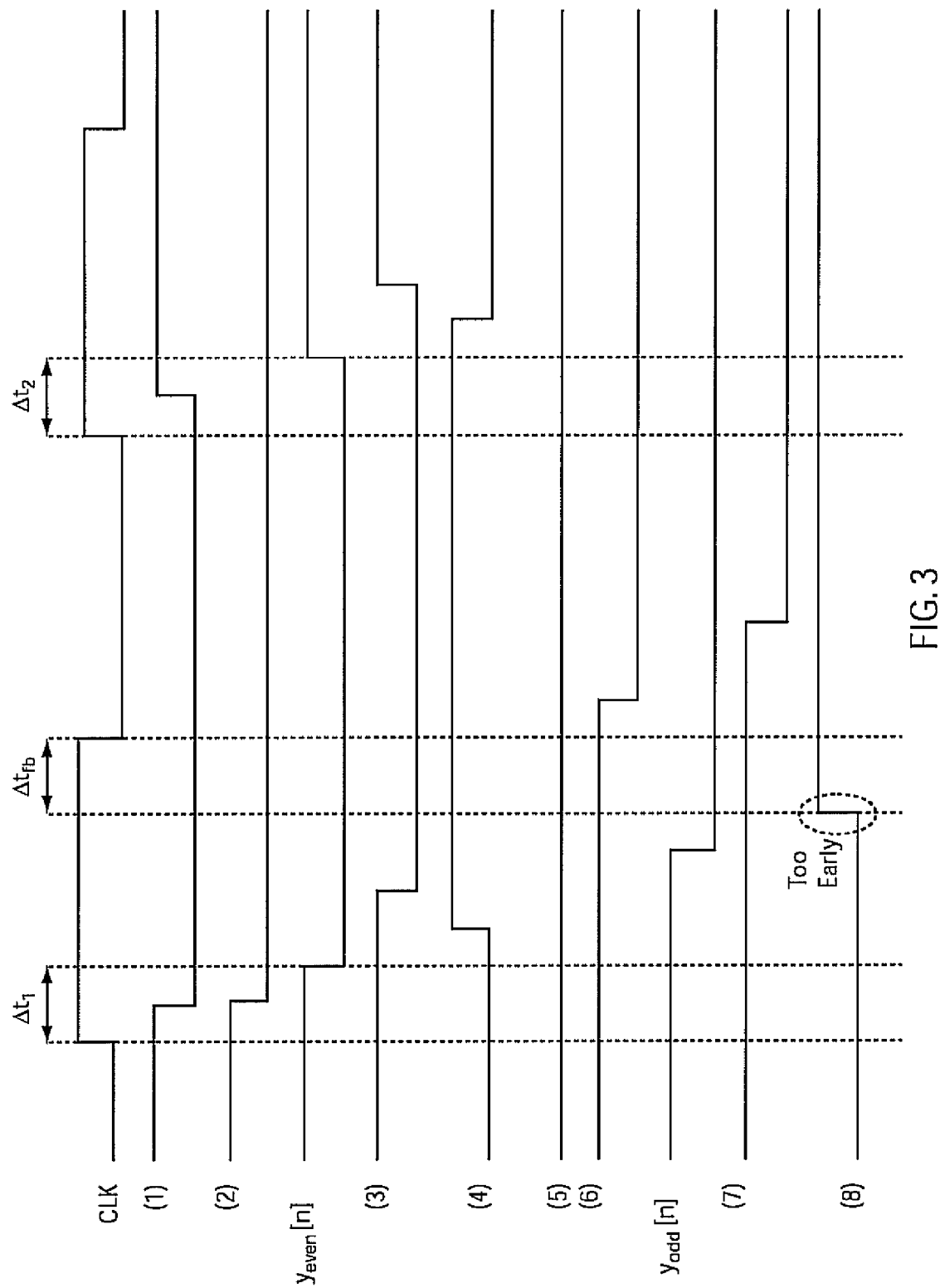
FIG. 3 is a timing diagram of the DFE architecture shown in FIG. 1 with clocking of L5 and L10 inverted in accordance with a less preferable solution.

Referring to FIG. 3, in particular, note that the falling edge in the output of latch L10 (signal (7)) now occurs well before the second rising edge of CLK. Since the select signal (7) for the 2:1 MUX 20 (in the even DFE half) arrives well ahead of the data hits from master-slave flip-flops L1-L2 and L3-L4 (signals (1) and (2)), the delay ($\Delta t_2$) between the second rising edge of CLK and the update in the value of $y_{even}[n]$ is no longer inflated (i.e., $\Delta t_2 = \Delta t_1$).

Unfortunately, simply inverting the clocking of latches L5 and L10 creates another problem which disallows its usage. In situations where the two paths used for speculation have generated different decisions, early arrival of the select signal switches the output of the 2:1 MUX (20 or 22), which then disturbs the h2 feedback signal before the master-slave flip-flops have had a chance to sample the equalized signal. This premature disturbance of the h2 feedback signal can be observed in FIG. 3. The first falling edge of signal (3) switches the output ($y_{odd}[n]$) of the 2:1 MUX 22 from high to low, which in turn switches the h2 feedback signal (signal (8)) from low to high. This disturbance of the h2 feedback signal, which ruins the accuracy of the ISI compensation, occurs $\Delta t_{fb}$ earlier than the first falling edge of CLK. Since the lower master-slave flip-flops (L6-L7 and L8-L9) sample the equalized signal upon this falling edge of CLK, their decisions may be corrupted by the disturbance of the h2 feedback signal.

Advantageously, the present principles provide apparatuses and methods for eliminating the second critical timing path while still preventing disturbance of the h2 feedback signal at the time of data decision by the slicers (e.g., master-slave flip-flops).

Figure 4:
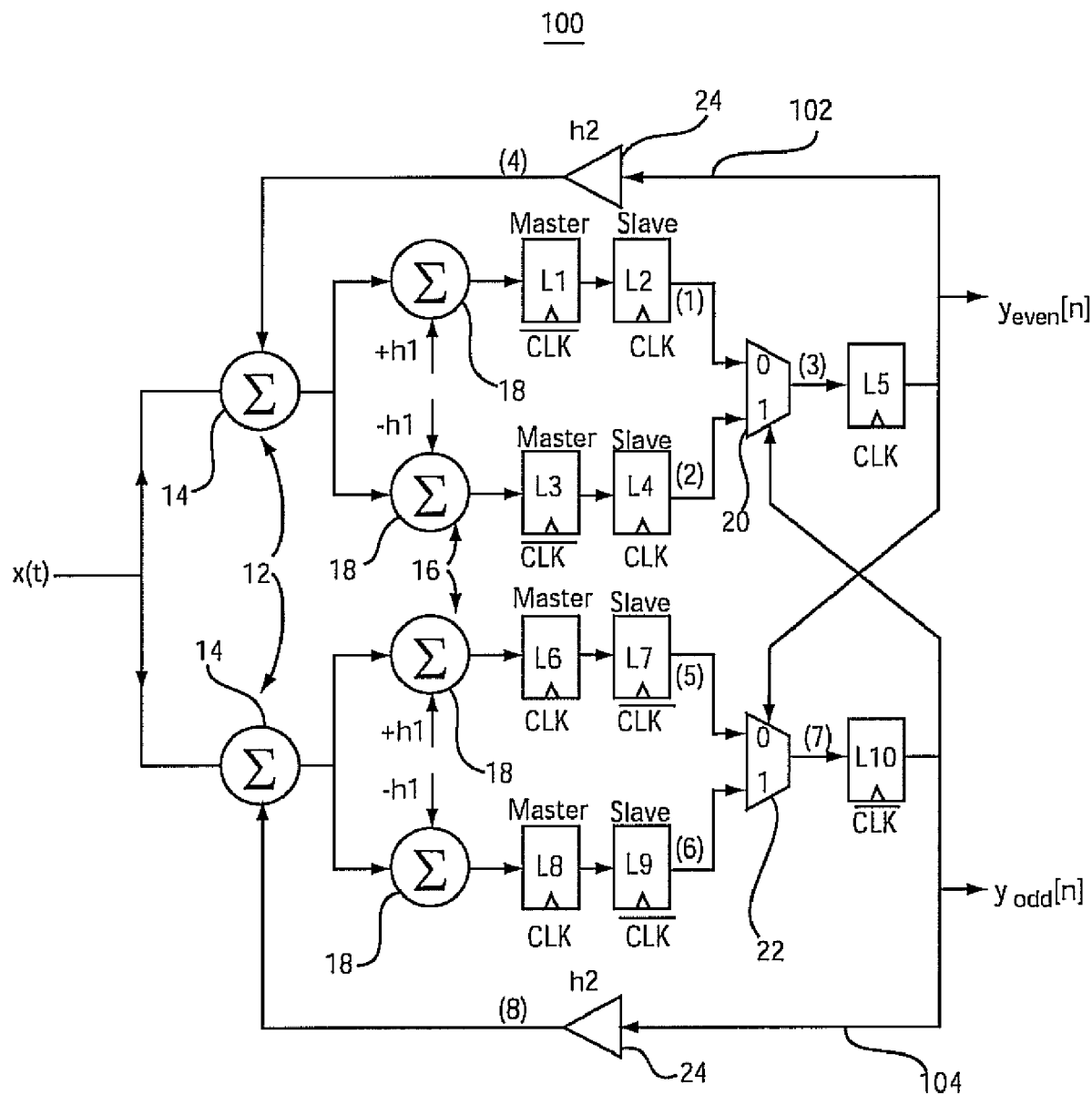
FIG. 4 is a schematic diagram showing a half-rate DFE architecture representing one embodiment in accordance with the present principles.

Referring to FIG. 4, one representative embodiment includes a DFE circuit architecture 100. Clocking of latches L5 and L10 is inverted as described above with reference to FIG. 3. This inversion of the clocking does eliminate the second critical timing path. Note that the even side latch L5 is clocked with CLK while the odd side latch L10 is clocked with its complement or CLK bar. In addition, the h2 feedback generators 24 are connected directly (102 and 104) to the outputs of latches L5 and L10, respectively.

Figure 5:
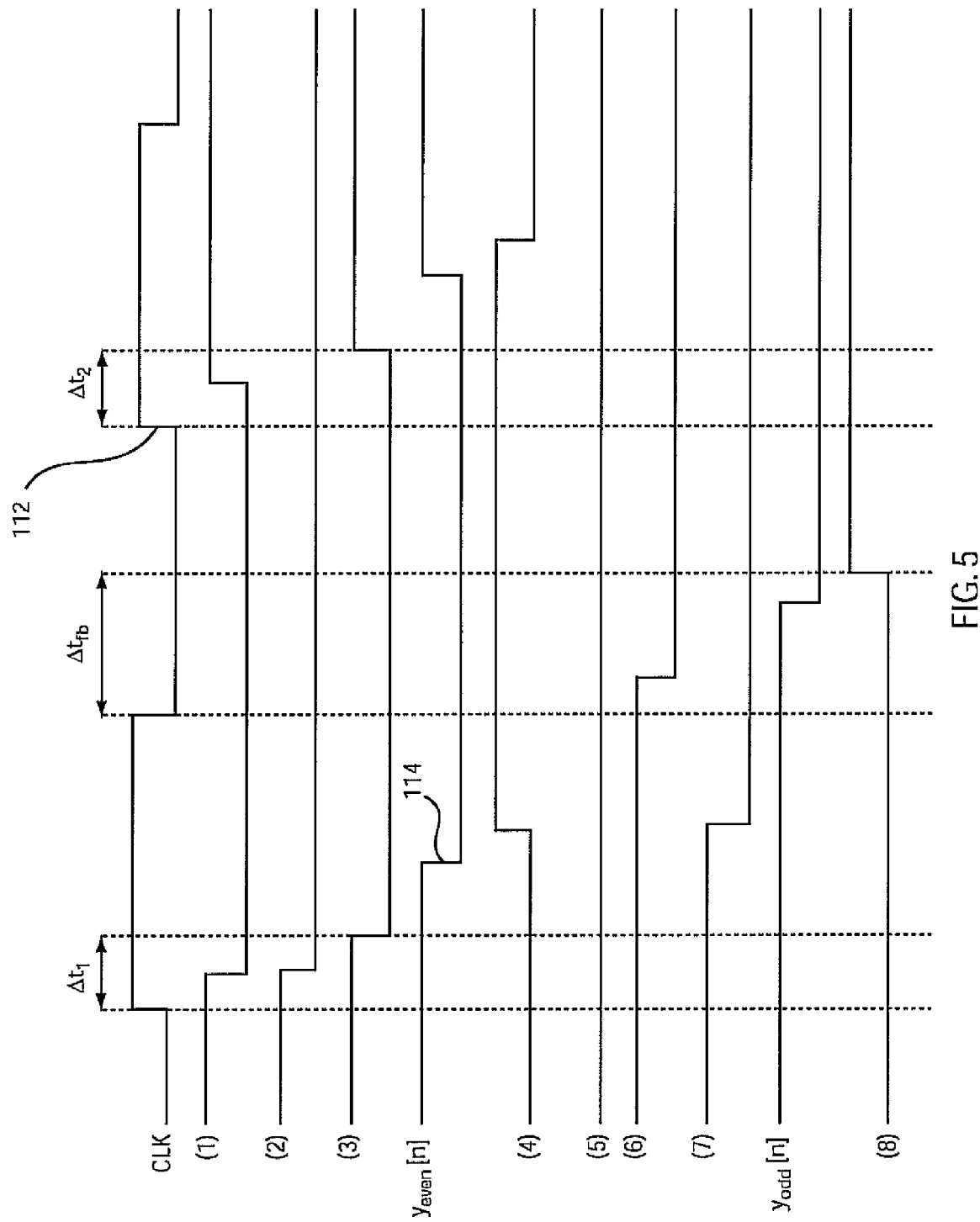
FIG. 5 is a timing diagram of the DFE architecture shown in FIG. 4.

Referring to FIG. 5 with continued reference to FIG. 4, a timing diagram of the DFE architecture shown in FIG. 4 is illustratively presented. Because the falling edge in the output of latch L10 (now denoted $y_{odd}[n]$) occurs well before a second rising edge 112 of CLK, the switching of the output (signal (3)) of the 2:1 MUX 20 is not held up by the arrival of its select signal, and $\Delta t_2 = \Delta t_1$. Premature disturbance of the h2 feedback signals is avoided by driving the h2 feedback circuits 24 from the L5/L10 outputs (102 and 104) instead of the 2:1 MUX outputs. Insertion of the L5 (or L10) latch between the 2:1 MUX 20 (or 22) and the h2 feedback circuitry only adds a small propagation delay to the h2 feedback signal (signals (4) and (8)), as the latches L5 and L10 are transparent when the master-slave flip-flops (L1-L4 and L6-L9) make their bit decisions.

One UI later, the latch (L5 or L10) is switched to the opaque state so that the h2 feedback signal ((4) or (8)) is protected from changes in the 2:1 MUX (20 or 22) output that can occur when the MUX select signal is switched. This protection of the h2 feedback signal (4) or (8) is evidenced in FIG. 5. A first falling edge 114 of $y_{even}[n]$ does change the output (signal (7)) of the 2:1 MUX 22 from high to low, but the new logic level does not immediately propagate to the output ($y_{odd}[n]$) of latch L10, which is opaque while CLK is high. This latch (L10) output is only updated to the new logic level when CLK goes low, so the change in the h2 feedback signal (signal (8)) now occurs $\Delta t_{fb}$ later than the first falling edge of CLK.

Because the second critical timing path is eliminated, and premature disturbance of the h2 feedback signal (4) or (8) is prevented, the implementation of FIG. 4 is able to achieve the fundamental timing limit of a half-rate DFE architecture with one tap of speculation.

It should be understood that the addition of the +h1 and −h1 DC offsets to the input signals can be accomplished with an explicit summing stage (such as the second stage summers in FIG. 4). Alternatively, the +h1 and −h1 DC offsets can be implicitly added to the input signal by employing decision-making slicers with built-in offsets equal to +h1 and −h1. In some cases, this use of decision-making slicers with built-in offsets will be advantageous in terms of hardware efficiency and power dissipation compared to using explicit summing stages. The use of decision-making slicers with built-in offsets does not change the mathematical functions being implemented and can be applied to any DFE architecture representing embodiments in accordance with the present principles. It should be further understood that the elements depicted in the FIGS. may be substituted with other elements to provide the same or similar functions as described herein.

While the architecture of FIG. 4 is a practicable embodiment, it may not be the most efficient one possible in terms of hardware complexity. In particular, there is redundancy between the slave latches L2 and L4 (or L7 and L9) and the latch L5 (or L10). Since L2 and L4 are clocked with the same phase of CLK as L5, L2 and L4 are in the opaque state when L5 is in the opaque state. If L5 is in the opaque state, though, it ignores the output of the 2:1 MUX 20, so holding the data inputs of the 2:1 MUX 20 constant with the slave latches is unnecessary.

Figure 6:
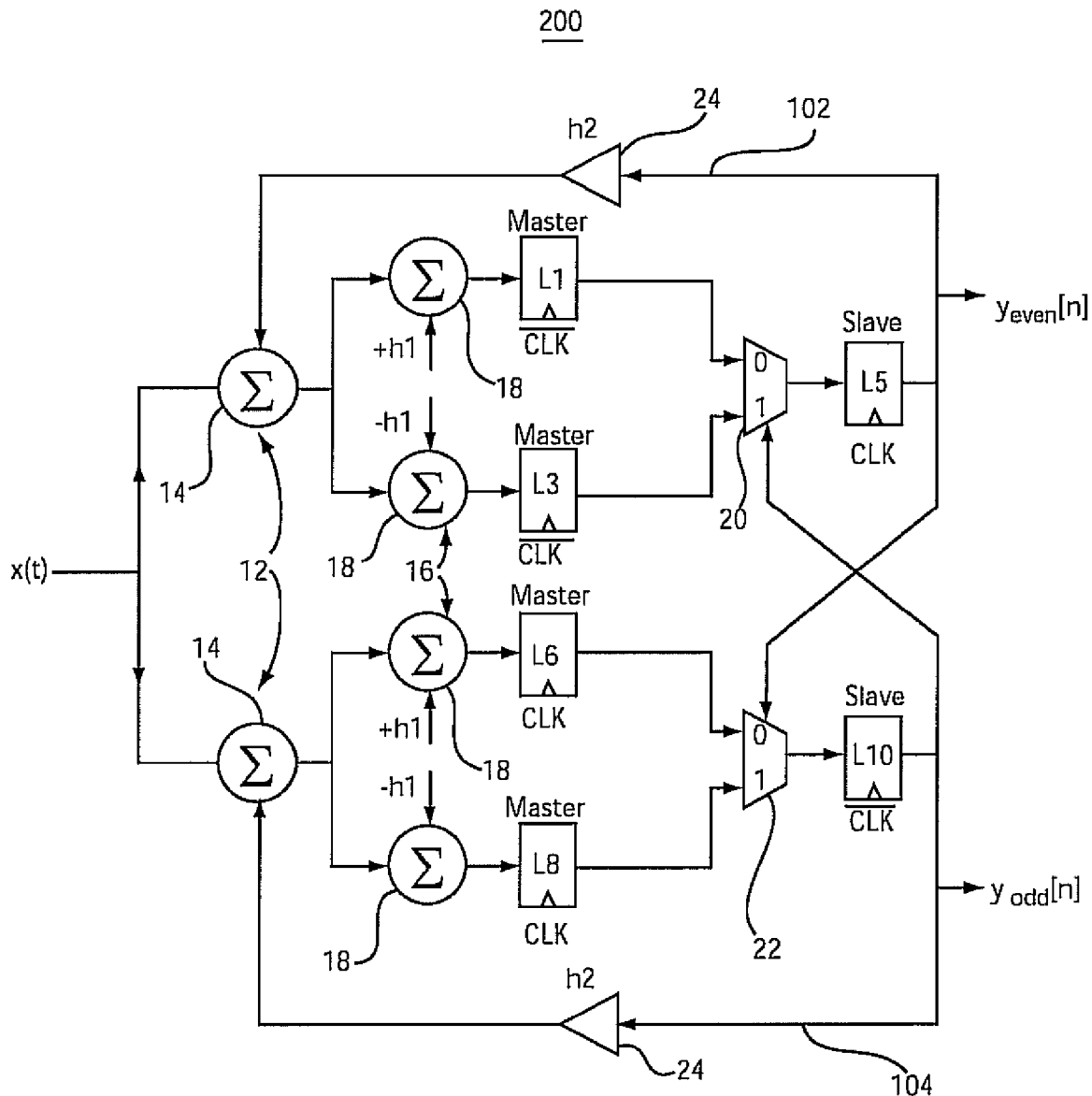
FIG. 6 is a half-rate DFE architecture representing an alternate embodiment in which redundant latches are eliminated.

Referring to FIG. 6, a DFE architecture 200 includes a more efficient configuration in addition to the improvements depicted in FIG. 4. All four slave latches (L2, L4, L7, and L9) are eliminated without altering the operation of the DFE 200.

Since these latches (L2, L4, L7, and L9) no longer contribute propagation delay to the critical timing path of the DFE loop, this alternative embodiment not only saves hardware but also increases the maximum operating frequency of the equalizer 200. As suggested in the labeling of FIG. 6, latches L5 and L10 now serve as the slaves to the masters L1, L3, L6, and L8.

It should be noted that the description of the present embodiments has been focused on the equalization of binary (two-level) signals. However, the present principles are also applicable to the equalization of multi-level signals, such as four-level pulse amplitude modulation (PAM-4) signals.

Figure 7:
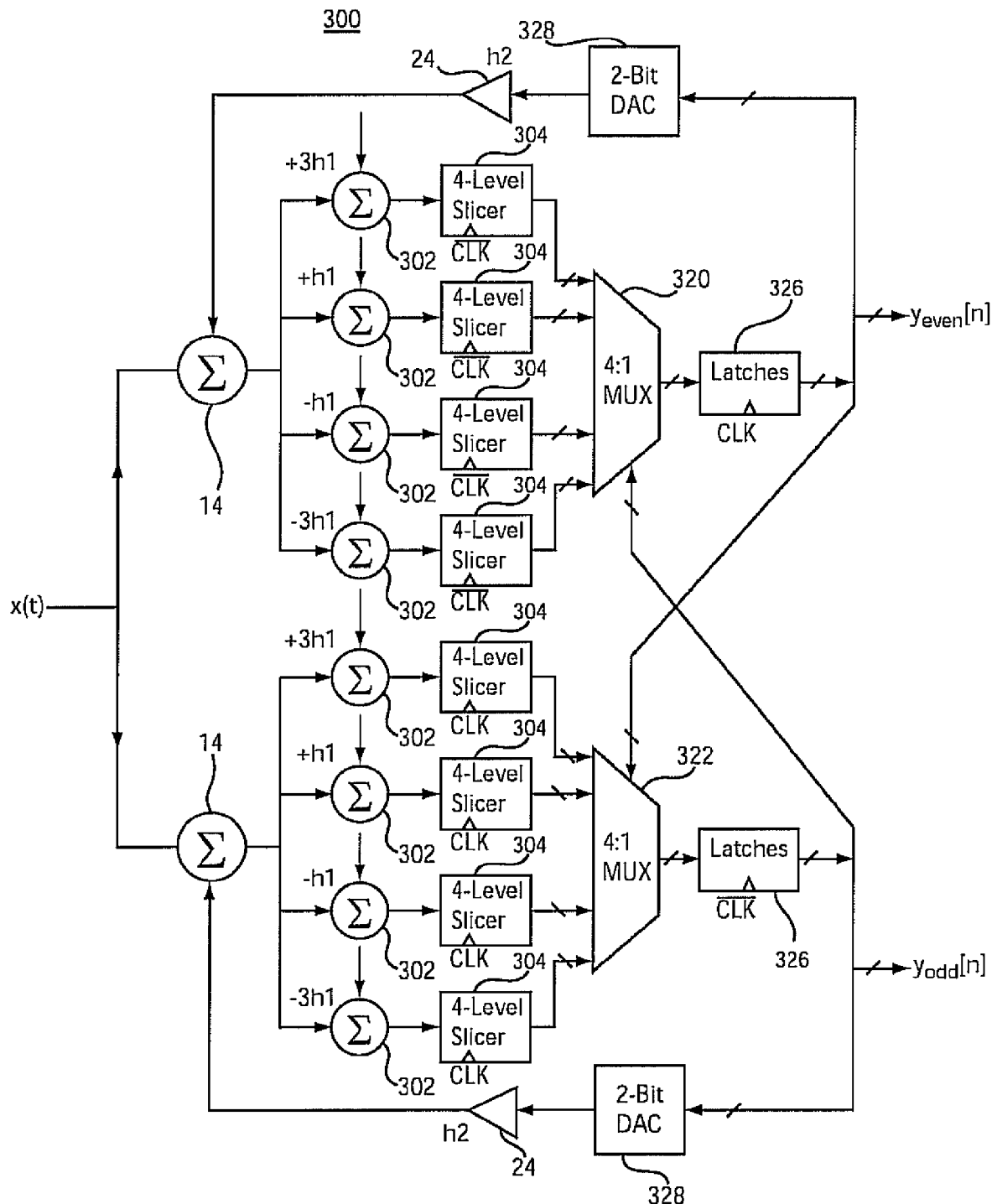
FIG. 7 shows a modification of the half-rate DFE architecture shown in FIG. 6 for operation with PAM-4 signaling.

Referring to FIG. 7, a DFE architecture 300 is illustratively depicted. Architecture 300 includes a modified version of FIG. 6; however, the circuit 100 of FIG. 4 may also be modified to handle multi-level signals. Architecture 300 performs equalization of PAM-4 signals. Since the previous PAM-4 symbol may have one of four different values (with normalized signal levels of $-3$, $-1$, $+1$, and $+3$), each DFE half now has four speculative paths (with offsets of $+3h1$, $+h1$, $-h1$, and $-3h1$, respectively). Instead of a master latch (e.g., a simple 2-level slicer), a 4-level slicer 304 converts the analog output of each second stage summer 302 to a multi-bit (e.g., 2-bit) code representing a data decision. Once the previous PAM-4 symbol is known, the data decision corresponding to the correct value of h1 compensation is selected with a 4:1 MUX 320 (or 322).

Since the output of the 4:1 MUX 320 (or 322) is a multi-bit code, each latch circuit 326 at the output of a 2:1 MUX 320 (or 322) includes a group of latches. In each DFE half, a 2-bit digital-to-analog converter (DAC) 328 is used to generate one of four levels for the h2 dynamic feedback signal. Like the two-level embodiments of FIG. 4 and FIG. 6, this four-level embodiment achieves the fundamental timing limit of a half-rate DFE architecture with one tap of speculation.

Other modifications and variations of the disclosed embodiments, such as the use of quarter-rate, eighth-rate, sixteenth-rate, etc. instead of half-rate architecture are also contemplated. Such modifications and variations do not depart from the spirit and scope of the present claims.

Having described preferred embodiments of a decision feedback equalizer (DFE) architecture (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A decision feedback equalizer (DFE), comprising:
summer circuits configured to add a dynamic feedback signal representing an h2 tap to a received input and to speculate on an h1 tap;
data slicers configured to receive outputs of the summer circuits and sample the outputs of the summer circuits in accordance with a clock signal such that first data slicers produce even data bits and second data slicers produce odd data bits;
first and second multiplexers configured to receive as input, respectively, the even data bits and the odd data bits;
a first clocked output latch configured to receive an output of the first multiplexer wherein a first latch output is employed to provide a select signal for the second multiplexer and to drive the dynamic feedback signal to an even half summer circuit of the summer circuits; and
a second clocked output latch configured to receive an output of the second multiplexer wherein a second latch output is employed to provide a select signal for the first multiplexer and to drive the dynamic feedback signal to an odd half summer circuit of the summer circuits.

2. The DFE as recited in claim 1, wherein the data slicers each include a pair of master-slave latches.

3. The DFE as recited in claim 2, wherein the pair of master-slave latches operates such that when a master of each pair employs a clock signal, a corresponding one of the first clocked output latch and the second clocked output latch employs a clock signal complement, and when the master of each pair employs the clock signal complement, a corresponding one of the first clocked output latch and the second clocked output latch employs the clock signal.

4. The DFE as recited in claim 1, wherein the data slicers each include a master latch and a corresponding one of the first clocked output latch and the second clocked output latch acts as a slave latch.

5. The DFE as recited in claim 4, wherein when the master latch employs a clock signal, the slave latch employs a clock signal complement, and when the master latch employs the clock signal complement, the slave latch employs the clock signal.

6. The DFE as recited in claim 1, wherein the DFE includes a multi-level DFE, where the multi-level includes greater than two levels.

7. The DFE as recited in claim 6, wherein the DFE operates with 4 level pulse amplitude modulation signaling.

8. The DFE as recited in claim 1, wherein the clock signal is a half rate clock signal.

9. The DFE as recited in claim 1, wherein the DFE achieves a fundamental timing limit of a half-rate DFE architecture with one tap of speculation.

10. A decision feedback equalizer (DFE), comprising:
first stage summers configured to add a dynamic feedback signal representing an h2 tap to a received input;
second stage summers configured to speculate on an h1 tap where both +h1 and −h2 are separately added to an output of the first stage summers;
data slicers configured to receive outputs of the second stage summers and sample the outputs of the second stage summers in accordance with a clock signal such that first data slicers produce even data bits and second data slicers produce odd data bits;
a first multiplexer configured to receive as input the even data bits;
a second multiplexer configured to receive as input the odd data bits;
a first clocked output latch configured to receive an output of the first multiplexer wherein a first latch output is employed to provide a select signal for the second multiplexer and to drive the dynamic feedback signal to an even half summer circuit of the first stage summers; and
a second clocked output latch configured to receive an output of the second multiplexer wherein a second latch output is employed to provide a select signal for the first multiplexer and to drive the dynamic feedback signal to an odd half summer circuit of the first stage summers such that the first and second clocked output latches provide protection against disturbances for the dynamic feedback signal without introducing another critical path delay.

11. The DFE as recited in claim 10, wherein the data slicers each include a pair of master-slave latches.

12. The DFE as recited in claim 11, wherein the pair of master-slave latches operates such that when a master of each pair employs a clock signal, a corresponding one of the first clocked output latch and the second clocked output latch employs a clock signal complement, and when the master of each pair employs the clock signal complement, a corresponding one of the first clocked output latch and the second clocked output latch employs the clock signal.

13. The DFE as recited in claim 10, wherein the data slicers each include a master latch and a corresponding one of the first clocked output latch and the second clocked output latch acts as a slave latch.

14. The DFE as recited in claim 13, wherein when the master latch employs a clock signal, the slave latch employs a clock signal complement, and when the master latch employs the clock signal complement, the slave latch employs the clock signal.

15. The DFE as recited in claim 10, wherein the DFE includes a multi-level DFE, where the multi-level includes greater than two levels.

16. The DFE as recited in claim 10, wherein the DFE achieves a fundamental timing limit of a half rate DFE architecture with one tap of speculation.

17. A method for decision feedback equalizing, comprising:
speculating on an h1 tap using summer circuits configured to add a dynamic feedback signal representing an h2 tap to a received input;
sampling outputs of the summer circuits in accordance with a clock signal such that first data slicers produce even data bits and second data slicers produce odd data bits;
multiplexing the even data bits and the odd data bits using first and second multiplexers, respectively; and
latching outputs of the first and second multiplexers such that a first latch output from a first clocked output latch corresponding to the first multiplexer is employed to provide a select signal for the second multiplexer and to drive the dynamic feedback signal to an even half summer circuit of the summer circuits, and a second latch output from a second clocked output latch corresponding to the second multiplexer is employed to provide a select signal for the first multiplexer and to drive the dynamic feedback signal to an odd half summer circuit of the summer circuits.

18. The method as recited in claim 17, wherein the data slicers each include a master latch and the method further comprising: when the master latch employs a clock signal, a corresponding one of the first clocked output latch and the second clocked output latch employs a clock signal complement, and when the master latch employs the clock signal complement, a corresponding one of the first clocked output latch and the second clocked output latch employs the clock signal.

19. The method as recited in claim 18, wherein the corresponding one of the first clocked output latch and the second clocked output latch acts as a slave latch.

20. The method as recited in claim 17, wherein the data slicers each include a master latch and a slave latch, and the method further comprising: when the master latch employs a clock signal, a corresponding one of the first clocked output latch and the second clocked output latch employs a clock signal complement, and when the master latch employs the clock signal complement, a corresponding one of the first clocked output latch and the second clocked output latch employs the clock signal.

* * * * *